(12) United States Patent
Hagari

(10) Patent No.: US 10,590,871 B2
(45) Date of Patent: Mar. 17, 2020

(54) CONTROLLER AND CONTROL METHOD FOR INTERNAL COMBUSTION ENGINE

(71) Applicant: Mitsubishi Electric Corporation, Tokyo (JP)

(72) Inventor: Hideki Hagari, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 132 days.

(21) Appl. No.: 15/869,170

(22) Filed: Jan. 12, 2018

(65) Prior Publication Data

US 2018/0372011 A1 Dec. 27, 2018

(30) Foreign Application Priority Data

Jun. 27, 2017 (JP) .................................. 2017-124788

(51) Int. Cl.
*F02D 41/14* (2006.01)
*F01N 9/00* (2006.01)
(Continued)

(52) U.S. Cl.
CPC ......... *F02D 41/0072* (2013.01); *F01N 9/005* (2013.01); *F02D 23/02* (2013.01);
(Continued)

(58) Field of Classification Search
CPC ........... F02D 41/1447; F02D 2041/007; F02D 2200/0414; F02D 2200/0804; F01N 9/005
(Continued)

(56) References Cited

U.S. PATENT DOCUMENTS 6,116,083 A * 9/2000 Cullen ................ F02D 41/0072
73/114.69
6,508,242 B2 * 1/2003 Jaliwala .................. F01N 9/005
123/676

(Continued)

FOREIGN PATENT DOCUMENTS

JP 2003-90691 A 3/2003
JP 2004-44527 A 2/2004
(Continued)

OTHER PUBLICATIONS

Communication dated Jul. 24, 2018 from the Japanese Patent Office in counterpart Application No. 2017-124788.
(Continued)

*Primary Examiner* — Erick R Solis
(74) *Attorney, Agent, or Firm* — Sughrue Mion, PLLC; Richard C. Turner

(57) ABSTRACT

To provide a controller and a control method for an internal combustion engine capable of estimating exhaust gas temperature at any estimation positions of the exhaust pipe with good accuracy by taking into consideration a temperature drop of exhaust gas by heat radiation of the exhaust pipe. A controller for an internal combustion engine is provided with an outlet gas temperature calculator that calculates an outlet gas temperature which is a temperature of exhaust gas at an outlet of a combustion chamber, based on the driving condition; a heat radiation amount calculator that calculates a temperature decrease amount of the exhaust gas by heat radiation of an exhaust pipe from the outlet of the combustion chamber to an estimation position; and an exhaust gas temperature estimation calculator that estimate an exhaust gas temperature at the estimation position by subtracting the temperature decrease amount from the outlet gas temperature.

12 Claims, 7 Drawing Sheets

(51) Int. Cl.
*F02D 41/00* (2006.01)
*F02D 23/02* (2006.01)
*G06F 17/10* (2006.01)
*F02D 41/22* (2006.01)
*F02D 13/02* (2006.01)

(52) U.S. Cl.
CPC ......... *F02D 41/1447* (2013.01); *G06F 17/10* (2013.01); *F02D 13/0215* (2013.01); *F02D 41/0007* (2013.01); *F02D 41/22* (2013.01); *F02D 2041/007* (2013.01); *F02D 2200/0404* (2013.01); *F02D 2200/0406* (2013.01); *F02D 2200/0414* (2013.01); *F02D 2200/0804* (2013.01)

(58) Field of Classification Search
USPC ........................................................ 123/689
See application file for complete search history.

(56) References Cited

U.S. PATENT DOCUMENTS

| | | | | |
|---|---|---|---|---|
| 7,779,626 | B2* | 8/2010 | Ohsaki | F02D 41/0072 60/276 |
| 7,810,476 | B2* | 10/2010 | Wang | F02D 35/025 123/568.16 |
| 7,937,995 | B2* | 5/2011 | Brinkmeier | F01N 11/002 73/114.75 |
| 2002/0005064 | A1* | 1/2002 | Ohkuma | F01N 11/005 73/114.74 |
| 2013/0245967 | A1 | 9/2013 | Hagari et al. | |
| 2015/0032390 | A1 | 1/2015 | Adachi | |
| 2016/0169168 | A1 | 6/2016 | Hanawa et al. | |
| 2017/0051662 | A1 | 2/2017 | Hagari et al. | |
| 2017/0089282 | A1 | 3/2017 | Nishio et al. | |
| 2017/0089284 | A1 | 3/2017 | Miura et al. | |
| 2017/0096957 | A1* | 4/2017 | Wu | F02D 37/02 |
| 2018/0106178 | A1* | 4/2018 | Nakada | B01D 53/94 |

FOREIGN PATENT DOCUMENTS

| | | |
|---|---|---|
| JP | 2004-197716 A | 7/2004 |
| JP | 2011-237047 A | 11/2011 |
| JP | 5373952 B1 | 12/2013 |
| JP | 5409832 B2 | 2/2014 |
| JP | 2015-31170 A | 2/2015 |
| JP | 2016-138726 A | 8/2016 |
| JP | 5963927 B1 | 8/2016 |
| JP | 2017-66934 A | 4/2017 |

OTHER PUBLICATIONS

Communication dated Jan. 22, 2019, from Japanese Patent Office in counterpart application No. 2017-124788.

* cited by examiner

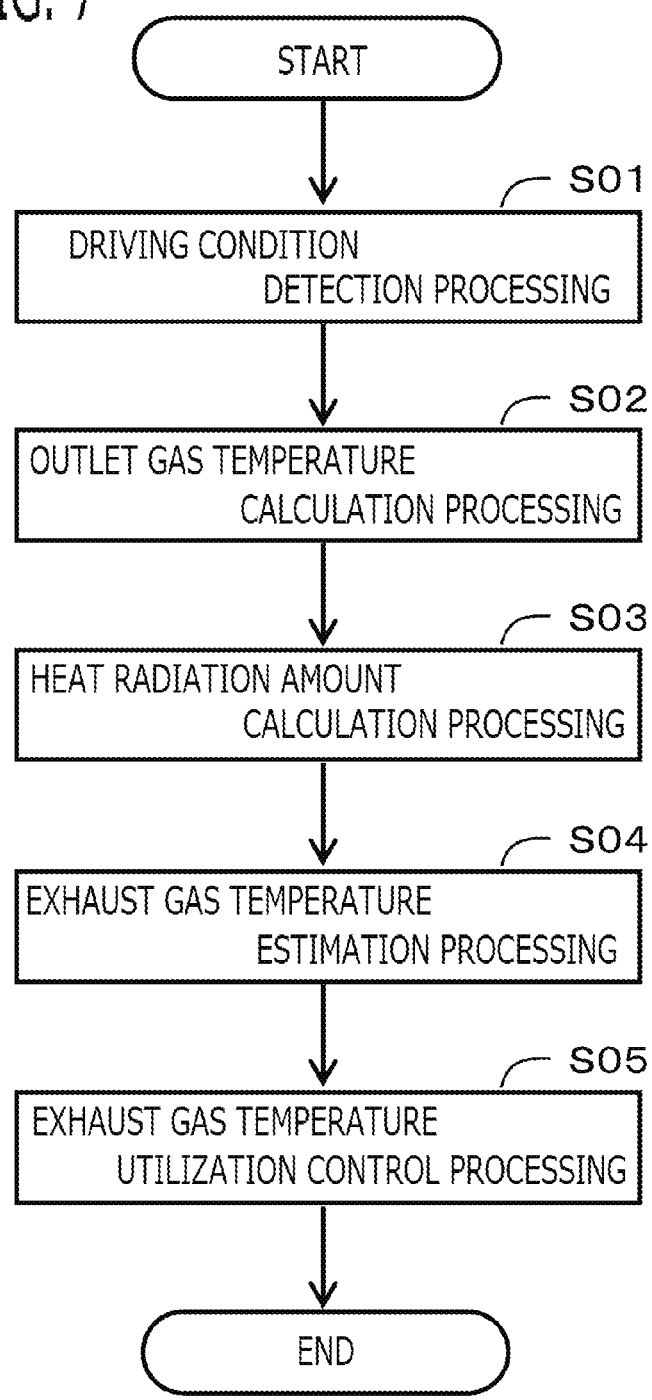

CONTROLLER AND CONTROL METHOD FOR INTERNAL COMBUSTION ENGINE

INCORPORATION BY REFERENCE

The disclosure of Japanese Patent Application No. 2017-124788 filed on Jun. 27, 2017 including its specification, claims and drawings, is incorporated herein by reference in its entirety.

BACKGROUND

The present disclosure relates to a controller and a control method for an internal combustion engine for estimating an exhaust gas temperature of the internal combustion engine.

In order to operate an internal combustion engine appropriately, it is important to accurately monitor state quantity, such as pressure and temperature of each part, which change according to operating condition of the internal combustion engine. In recent years, also using state quantity of the exhaust system, control of the internal combustion engine is performed. As a control using state quantity of the exhaust system, for example, enrichment control which makes air-fuel ratio rich to decrease exhaust gas temperature is performed, when there is a possibility of damaging a catalyst, an air-fuel ratio sensor, and the like, which are provided in the exhaust system, by rise of exhaust gas temperature at high rotation speed and high load operation. Although the exhaust gas temperature used for this control may be detected by an exhaust gas temperature sensor, there is also a method of estimating in order to reduce sensor cost. For example, by referring to map data in which a relationship among rotational speed, charging efficiency, and exhaust gas temperature is preliminarily set based on experimental data and the like, a method of estimating exhaust gas temperature is used.

As other examples using exhaust gas temperature, for example, in JP 5409832 B, although a method of calculating an intake air amount and an internal EGR rate of a combustion chamber using a volumetric efficiency corresponding value is disclosed, exhaust gas temperature is used for calculation of this volumetric efficiency corresponding value. Although a method of controlling an internal combustion engine with a supercharger is disclosed in JP 5963927 B, exhaust gas temperature is used for controlling an opening degree of wastegate required to achieve a target driving force of a compressor. In these documents, an estimation method of exhaust gas temperature using the similar map data as mentioned above is used. Besides these documents, exhaust gas temperature may be used for calculating a flow rate of external EGR based on an opening degree of an EGR valve.

Although the estimated exhaust gas temperature is used in the above-mentioned example; as an example using the exhaust gas temperature sensor, with strengthening of exhaust gas regulation, there is control which reduces emission amount of PM (Particulate Matter) included in exhaust gas of the internal combustion engine. Specifically, PM is caught by a particle collection filter attached to the exhaust system, such as DPF (Diesel Particulate Filter) and GPF (Gasoline Particulate Filter). However, since there is a limit on PM amount which the particle collection filter can catch, a regeneration process which burns PM accumulated in the particle collection filter is performed properly. In order to perform this regeneration process properly, exhaust gas temperature is controlled using the exhaust temperature sensor.

SUMMARY

As described above, although there is the estimation method using map data as an estimation method of exhaust gas temperature, exhaust gas temperature is easily influenced by ignition timing, EGR amount, and the like. For example, only by map setting which set the map axes to rotational speed and charging efficiency, there is a problem that it is difficult to estimate with sufficient accuracy if operating conditions, such as ignition timing and EGR amount, change. Since the number of maps will become enormous and man-hour required for matching will also become enormous if all exhaust gas temperatures in the case where ignition timing and EGR amount change are stored as maps, there is a problem in terms of estimation accuracy and matching man-hour in estimation of the exhaust gas temperature using map.

As other problems considered in the case of exhaust gas temperature estimation using map, in enrichment control, there is a problem that frequency of enrichment becomes high and fuel efficiency is deteriorated in order to reduce exhaust gas temperature certainly, taking a temperature estimation error into consideration. Since estimation accuracy of the internal EGR amount and the external EGR amount becomes low by estimation error of exhaust gas temperature, there is a problem that ignition timing control based on EGR amount is not performed properly, and fuel efficiency effect cannot be obtained enough. Also in the case where control of wastegate opening degree for controlling supercharging pressure is not performed properly by estimation error of exhaust gas temperature, there is a problem that drivability is deteriorated since acceleration feeling which driver requires is not obtained. These problems may be solved if estimation accuracy of exhaust gas temperature can be improved.

As estimation methods other than using map, for example, there is a method disclosed in JP 5373952 B. JP 5373952 B discloses a method of estimating exhaust gas temperature based on temperature rise by adiabatic compression and temperature rise by heat amount lost in exhaust gas. In the method of JP 5373952 B, although exhaust loss rate which affects exhaust gas temperature at the combustion chamber outlet is taken into consideration, temperature drop by heat radiation of the exhaust pipe after discharging from the combustion chamber is not taken into consideration. Therefore, if it tries to estimate exhaust gas temperature at any estimation positions of the exhaust pipe which is distant from the combustion chamber outlet, there is a problem that estimation error due to heat radiation amount of the exhaust pipe which changes according to the estimation position becomes large.

In the method of JP 5373952 B, exhaust loss rate which is a ratio of heat amount lost in exhaust gas to combustion heat amount is calculated by using rotational speed and fuel flow for parameters. However, exhaust loss rate is a ratio calculated by subtracting indicated work which can be taken out as work by internal cylinder pressure, and cooling loss which is heat amount radiated to wall surface of the combustion chamber, from combustion heat amount generated by combustion of fuel in the combustion chamber. In the technology of JP 5373952 B, since indicated work and cooling loss are not taken into consideration, there is a problem that calculation accuracy of exhaust loss rate is not good.

Since it is not easy to estimate exhaust gas temperature with good accuracy, an exhaust gas temperature sensor may be used. However, since the exhaust gas temperature sensor is attached to the exhaust system which becomes high temperature, it is necessary to perform abnormality diagnosis. In order to perform abnormality diagnosis, it is considered to use the estimated exhaust gas temperature, and, for that purpose, it is necessary eventually to estimate exhaust gas temperature with good accuracy.

Thus, it is desired to provide a controller and a control method for an internal combustion engine capable of estimating exhaust gas temperature at any estimation positions of the exhaust pipe with good accuracy by taking into consideration a temperature drop of exhaust gas by heat radiation of the exhaust pipe.

A controller for an internal combustion engine according to the present disclosure including:

a driving condition detector that detects driving condition of the internal combustion engine;

an outlet gas temperature calculator that calculates an outlet gas temperature which is a temperature of exhaust gas at an outlet of a combustion chamber, based on the driving condition;

a heat radiation amount calculator that calculates a temperature decrease amount of the exhaust gas by heat radiation of an exhaust pipe from the outlet of the combustion chamber to an estimation position; and an exhaust gas temperature estimation calculator that estimates an exhaust gas temperature at the estimation position by subtracting the temperature decrease amount from the outlet gas temperature.

A control method for an internal combustion engine according to the present disclosure including:

detecting driving condition of an internal combustion engine;

calculating an outlet gas temperature which is a temperature of exhaust gas at an outlet of a combustion chamber, based on the driving condition;

calculating a temperature decrease amount of the exhaust gas by heat radiation of an exhaust pipe from the outlet of the combustion chamber to an estimation position; and estimating an exhaust gas temperature at the estimation position by subtracting the temperature decrease amount from the outlet gas temperature.

According to the controller and the control method for the internal combustion engine concerning the present disclosure, since the exhaust gas temperature at the combustion chamber outlet and the temperature decrease amount of the exhaust pipe, which differ in physical phenomenon from each other, are separately calculated, each calculation accuracy can be improved. Since the temperature decrease amount of the exhaust gas by heat radiation of the exhaust pipe from the outlet of the combustion chamber to the estimation position is calculated, the exhaust gas temperature at any estimation positions of the exhaust pipe can be estimated with good accuracy.

BRIEF DESCRIPTION OF THE DRAWINGS

FIG. 7 is a flow chart showing processing by a controller according to Embodiment 1 of the present disclosure.

DETAILED DESCRIPTION OF THE EMBODIMENTS

Embodiment 1

Figure 1:
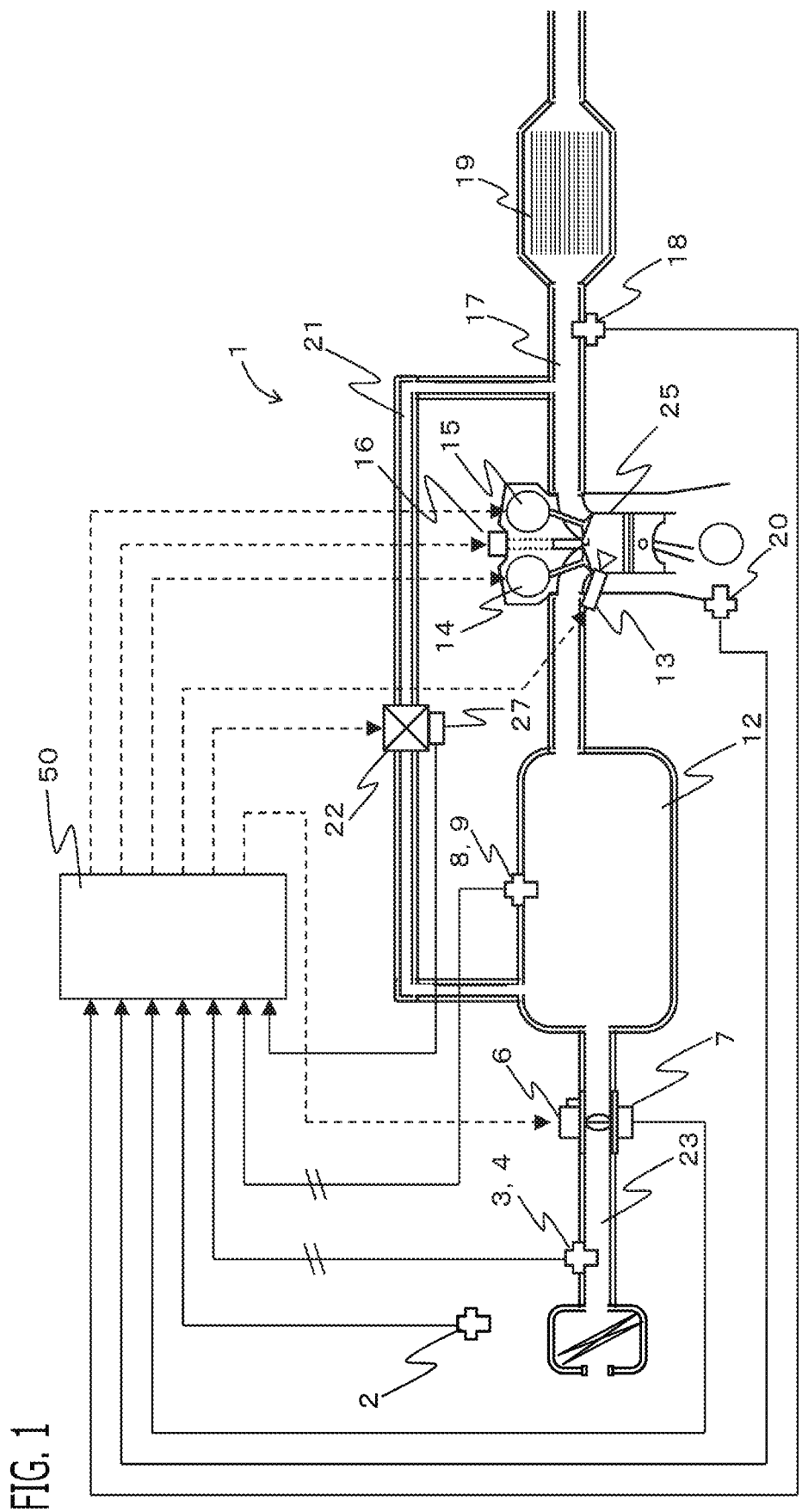
FIG. 1 is a schematic configuration diagram of an internal combustion engine and a controller according to Embodiment 1 of the present disclosure.
Figure 2:
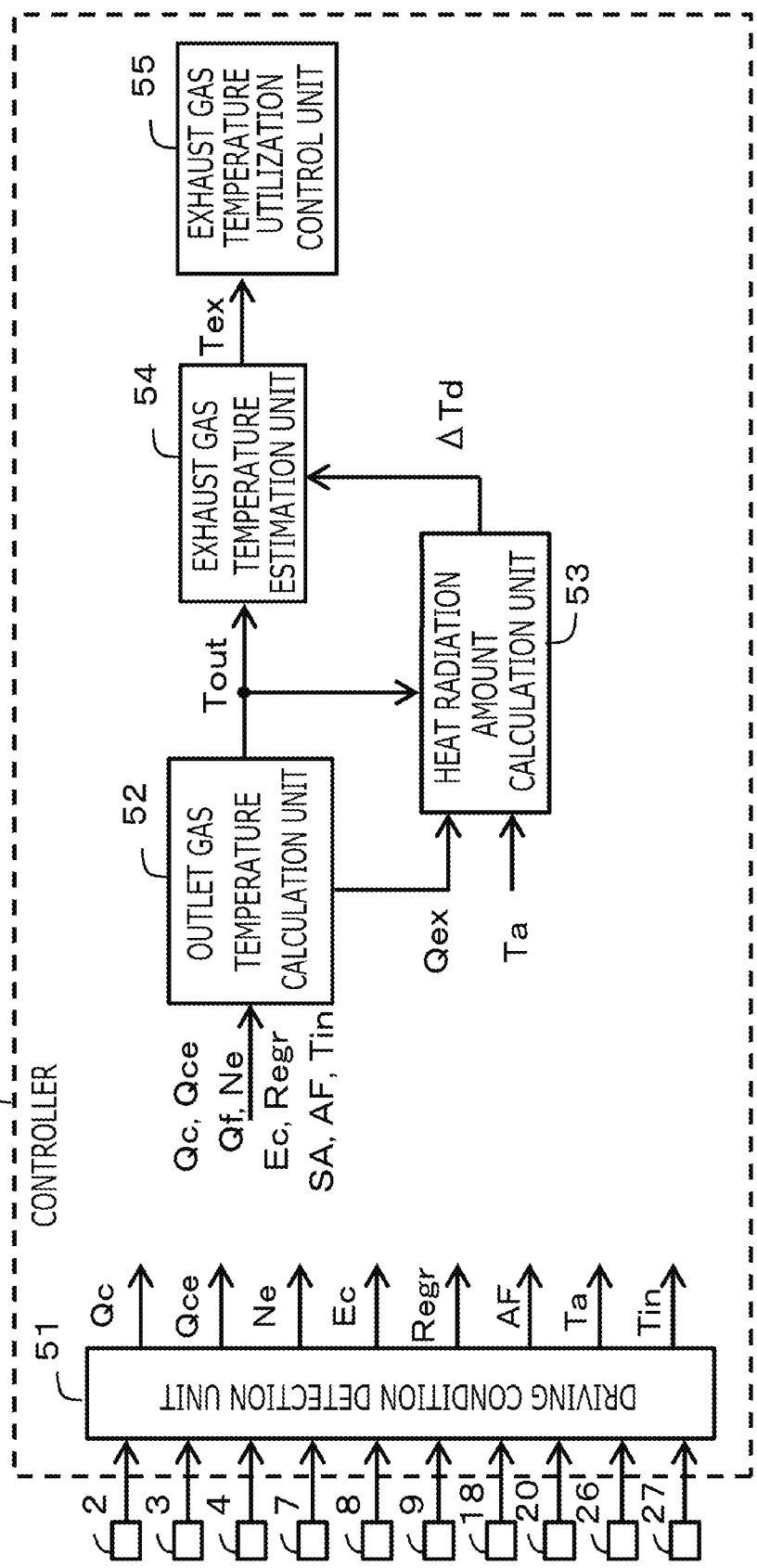
FIG. 2 is a block diagram of a controller according to Embodiment 1 of the present disclosure.

A controller 50 for an internal combustion engine 1 (hereinafter, referred to simply as the controller 50) according to Embodiment 1 will be explained with reference to the drawings. FIG. 1 is a schematic configuration diagram of the internal combustion engine 1, and FIG. 2 is a block diagram of the controller 50 according to Embodiment 1. The internal combustion engine 1 and the controller 50 are mounted in a vehicle; the internal combustion engine 1 functions as a driving-force source for the vehicle (wheels).

1. Configuration of Internal Combustion Engine 1

As shown in FIG. 1, the internal combustion engine 1 is provided with a combustion chamber 25 in which a fuel-air mixture is combusted. The internal combustion engine 1 is provided with an intake pipe 23 for supplying air to the combustion chamber 25 and an exhaust pipe 17 for discharging exhaust gas from the combustion chamber 25. The combustion chamber 25 is configured by a cylinder and a piston. Hereinafter, the combustion chamber 25 is also referred to the cylinder. The internal combustion engine 1 is a gasoline engine. The internal combustion engine 1 has a throttle valve 6 for opening and closing the intake pipe 23. The throttle valve 6 is an electronically controlled throttle valve which is opening/closing-driven by an electric motor controlled by the controller 50. The throttle valve 6 is provided with a throttle opening degree sensor 7 which generates an electric signal according to a throttle opening degree of the throttle valve 6.

In the intake pipe 23 at the upstream side of the throttle valve 6, there are provided an air flow sensor 3 which outputs an electric signal according to an intake air flow rate taken into the intake pipe 23, and an intake air temperature sensor 4 which outputs an electric signal according to a temperature of intake air. The temperature of intake air detected by the intake air temperature sensor 4 can be regarded as equal to an outside air temperature Ta.

The internal combustion engine 1 has an EGR passage 21 which recirculates exhaust gas from the exhaust pipe 17 to the intake manifold 12, and an EGR valve 22 which opens and closes the EGR passage 21. The intake manifold 12 is a part of the intake pipe 23 at downstream side of the throttle valve 6. The EGR valve 22 is an electronic controlled EGR valve which an opening-and-closing drive is carried out with the electric motor controlled by controller 50. The EGR valve 22 is provided with an EGR opening degree sensor 27 which outputs an electric signal according to the opening degree of the EGR valve 22. "EGR" is an acronym for Exhaust Gas Recirculation. EGR that the exhaust gas recirculates via the EGR valve 22 is called external EGR, and EGR that the exhaust gas remains in the combustion chamber by valve overlap of intake and exhaust valves is called internal EGR. Hereinafter, external EGR is simply called EGR.

In the intake manifold 12, there are provided a manifold pressure sensor 8 which outputs an electric signal according to a manifold pressure, which is a pressure of gas in the intake manifold 12, and a manifold temperature sensor 9 which outputs an electric signal according to a manifold temperature Tin, which is a temperature of gas in the intake manifold 12.

The internal combustion engine 1 is provided with an injector 13 which supplies fuel into the combustion chamber 25. The injector 13 may be provided so as to inject fuel to a downstream side part of the intake manifold 12. The internal combustion engine 1 is provided with an atmospheric pressure sensor 2 which outputs an electric signal according to an atmospheric pressure.

An ignition plug for igniting a fuel-air mixture and an ignition coil 16 for supplying ignition energy to the ignition plug are provided on the top of the combustion chamber 25. On the top of the combustion chamber 25, there are provided an intake valve 14 for adjusting an intake air amount to be taken from the intake pipe 23 into the combustion chamber 25 and an exhaust valve 15 for adjusting an exhaust gas amount to be exhausted the combustion chamber 25 to the exhaust pipe 17. The intake valve 14 is provided with an intake variable valve timing mechanism which makes the opening and closing timing thereof variable. The exhaust valve 15 is provided with an exhaust variable valve timing mechanism which makes the opening and closing timing thereof variable. Each of the variable valve timing mechanisms 14, 15 has an electric actuator. On the crankshaft of the internal combustion engine 1, there is provided a crank angle sensor 20 for generating an electric signal according to the rotation angle thereof.

In the exhaust pipe 17, there is provided an air-fuel ratio sensor 18 which generates an electric signal according to an air-fuel ratio AF, which is the ratio of air to fuel in exhaust gas. A catalyst 19 for purifying exhaust gas is also provided in the exhaust pipe 17.

2. Configuration of Controller 50

Figure 3:
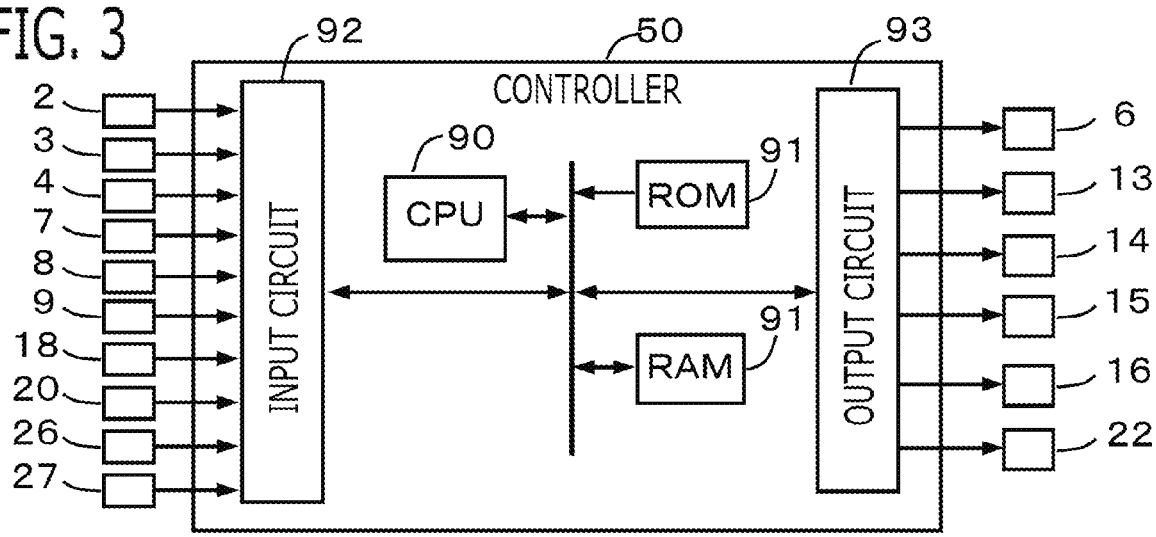
FIG. 3 is a hardware configuration diagram of a controller according to Embodiment 1 of the present disclosure.

Next, the controller 50 will be explained. The controller 50 is the one whose control subject is the internal combustion engine 1. As shown in the block diagram of FIG. 2, the controller 50 is provided with control units of a driving condition detection unit 51, an outlet gas temperature calculation unit 52, a heat radiation amount calculation unit 53, an exhaust gas temperature estimation unit 54, an exhaust gas temperature utilization control unit 55, and the like. The respective control units 51 through 55 and the like of the controller 50 are realized by processing circuits included in the controller 50. Specifically, as shown in FIG. 3, the controller includes, as a processing circuit, a calculation processor (computer) 90 such as a CPU (Central Processing Unit), storage apparatuses 91 that exchange data with the calculation processor 90, an input circuit 92 that inputs external signals to the calculation processor 90, an output circuit 93 that outputs signals from the calculation processor 90 to the outside, and the like.

As the calculation processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the calculation processor 90, a plurality of the same type ones or the different type ones may be provided, and each processing may be shared and executed. A random access memory (RAM) configured to be capable of reading and writing data from the calculation processor 90, a read only memory (ROM) configured to be capable of reading data from the calculation processor 90, and the like are equipped as the storage device 91. The input circuit 92 is connected with various kinds of sensors and switches and is provided with an A/D converter and the like for inputting output signals from the sensors and the switches to the calculation processor 90. The output circuit 93 is connected with electric loads and is provided with a driving circuit and the like for outputting a control signal from the calculation processor 90.

Then, the calculation processor 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 through 55 included in the controller 50 are realized. Setting data items such as characteristic data and constants to be utilized in the control units 51 through 55 are stored, as part of software items (programs), in the storage apparatus 91 such as a ROM.

In the present embodiment, the input circuit 92 is connected with the atmospheric pressure sensor 2, the air flow sensor 3, the intake air temperature sensor 4, the throttle opening degree sensor 7, the manifold pressure sensor 8, the manifold temperature sensor 9, the air-fuel ratio sensor 18, the crank angle sensor 20, an accelerator position sensor 26, the EGR opening degree sensor 27, and the like. The output circuit 93 is connected with the throttle valve 6 (electric motor), the injector 13, the intake variable valve timing mechanism 14, the exhaust variable valve timing mechanism 15, the ignition coil 16, the EGR valve 22 (the electric actuator), and the like. The controller 50 is connected with various kinds of unillustrated sensors, switches, actuators, and the like.

The driving condition detection unit 51 detects driving condition of the internal combustion engine 1. The driving condition detection unit 51 detects various kinds of driving conditions, based on the output signals of various kinds of sensors and the like. Specifically, the driving condition detection unit 51 detects an atmospheric pressure based on the output signal of the atmospheric pressure sensor 2; detects an intake air flow rate based on the output signal of the air flow sensor 3; detects an outside air temperature Ta based on the output signal of the intake air temperature sensor 4; detects a throttle opening degree based on the output signal of the throttle position sensor 7; detects a manifold pressure based on the output signal of the manifold pressure sensor 8; detects a manifold temperature Tin which is a temperature of gas in the intake manifold 12 based on the output signal of the manifold temperature sensor 9 and the like; detects an air-fuel ratio AF of the exhaust gas based on the output signal of the air-fuel ratio sensor 18; detects a crank angle and a rotational speed Ne based on the output signal of the crank angle sensor 20; detects an accelerator opening degree based on the output signal of the accelerator position sensor 26; and detects an EGR opening degree based on the output signal of the EGR opening degree sensor 27.

The driving condition detection unit 51 calculates an intake air amount Qc [g/stroke] which is a gas amount flowed in the combustion chamber 25 and a charging efficiency Ec [%], based on the intake air flow rate, the rotational speed Ne, and the like. For example, the driving condition detection unit 51 calculates, as the intake air amount Qc [g/stroke], a value obtained by applying filter processing, which simulates a delay in the intake manifold, to a value obtained by multiplying a stroke period according to the rotational speed Ne to the intake air flow rate [g/s]. If it is 3-cylinder engine, the stroke period becomes a period of 240 degCA, and if it is 4-cylinder engine, the stroke period becomes a period of 180 degCA. Alternatively, the driving condition detection unit 51 may calculate the intake air amount Qc [g/stroke] and the charging efficiency Ec [%] based on the manifold pressure, the rotational speed Ne, and the like.

The driving condition detection unit 51 calculates an EGR amount Qce [g/stroke] which is an exhaust gas recirculation amount flowed in the combustion chamber 25, based on the EGR opening degree and the like. For example, the driving condition detection unit 51 calculates an EGR flow rate [g/s] which passes EGR valve 22 based on the EGR opening degree, the manifold pressure, and the like; and calculates, as the EGR amount Qce [g/stroke], a value obtained by applying filter processing to a value obtained by multiplying the stroke period to the EGR flow rate. The driving condition detection unit 51 calculates an EGR rate Regr [%] which is a ratio of the EGR amount Qce to the intake air amount Qc.

Based on the rotational speed Ne and the intake air amount Qc, the charging efficiency Ec, the EGR rate Regr, and the like, the controller 50 calculates a target air fuel ratio, a fuel injection amount Qf, an ignition timing SA, and the like, and performs driving control of the injector 13, the ignition coil 16, and the like. For example, the controller 50 calculates a target air-fuel ratio based on the rotational speed Ne and the charging efficiency Ec, and calculates a basic value of fuel injection amount by dividing the intake air amount Qc by the target air-fuel ratio. Then, the controller 50 calculates a final fuel injection amount Qf by correcting the basic value of fuel injection amount in the case of performing air-fuel ratio feedback control using the air-fuel ratio sensor 18, and sets the basic value of fuel injection amount as the final fuel injection amount Qf directly in the case of not performing air-fuel ratio feedback control.

The controller 50 calculates a target throttle opening based on the accelerator opening degree and the like, and performs driving control of the electric motor of the throttle valve 6 so that the throttle opening degree approaches the target throttle opening. The controller 50 calculates a target EGR opening degree of the EGR valve 22 based on the rotational speed Ne, the charging efficiency Ec, and the like; and performs driving control of the electric actuator of the EGR valve 22 so that the EGR opening degree approaches the target EGR opening degree. The controller 50 calculates each target opening and closing timing (phase) of the intake valve 14 and the exhaust valve 15 based on the rotational speed Ne, the charging efficiency Ec, and the like; and performs driving control of the electric actuators of the intake and the exhaust variable valve timing mechanisms so that each opening and closing timing of the intake valve 14 and the exhaust valve 15 approaches each target opening and closing timing.

In the case of performing torque base control, the controller 50 controls the throttle opening degree, the ignition timing SA, the EGR opening degree, and the opening and closing timing of the intake valve 14 and the exhaust valve 15, so as to realize a demanded output torque of the internal combustion engine 1 calculated based on the accelerator opening degree and the like, or a demanded output torque of the internal combustion engine 1 required from an external controller such as a transmission controller. Specifically, the controller 50 calculates a target charging efficiency required for realizing the indicated thermal efficiency corresponding to the demanded output torque, based on a relationship between the charging efficiency Ec and the indicated thermal efficiency ηi which is preliminarily set by matching; calculates a target EGR rate at which fuel efficiency and emission gas become the optima, in the case of operating at the target charging efficiency; calculates a target throttle opening for achieving the target charging efficiency and the target EGR rate, the target EGR opening degree, the target opening and closing timing of the intake valve 14, and the target opening and closing timing of the exhaust valve 15; and performs driving control of the electric motor of the throttle valve 6, the electric actuator of the EGR valve 22, and the electric actuators of the intake and the exhaust variable valve timing mechanisms based on these target values.

2-1. Estimation Calculation of Exhaust Gas Temperature

The controller 50 is configured to estimate an exhaust gas temperature Tex other than the above mentioned general engine control. The estimated exhaust gas temperature Tex is used for calculation of the EGR rate and the like in the exhaust gas temperature utilization control unit 55 described below.

<Calculation Method of Exhaust Gas Temperature Using Single Flow Heat Exchanger Model>

First, a calculation method of exhaust gas temperature using a single flow heat exchanger model will be explained. The single flow heat exchanger is described in detail to "university lecture heat transfer engineering" (Maruzen Co., Ltd., P. 224 to 226, 1983).

Figure 4:
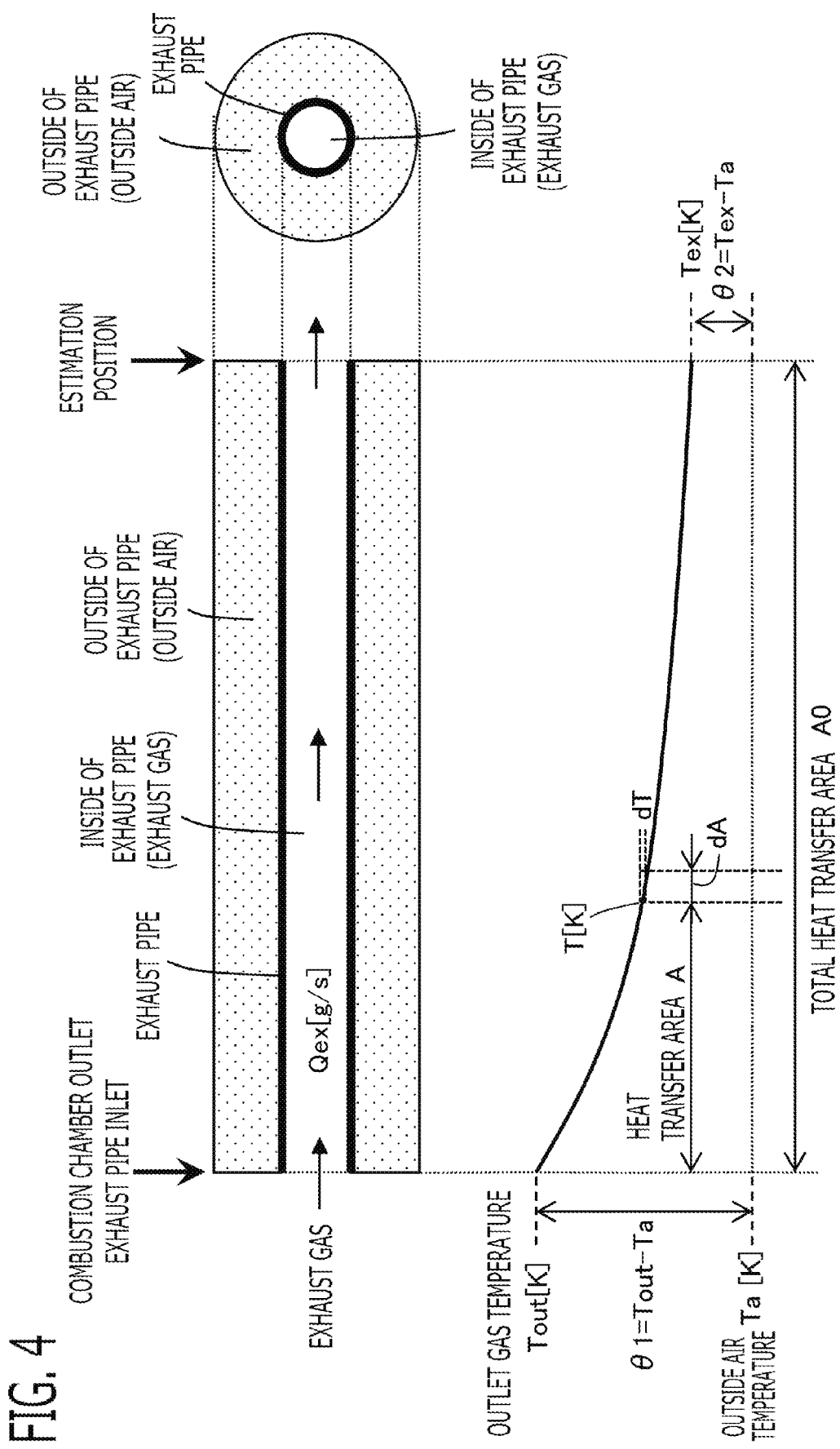
FIG. 4 is a figure schematically showing a single flow heat exchanger model of an exhaust pipe according to Embodiment 1 of the present disclosure.

FIG. 4 schematically shows the single flow heat exchanger model. An exhaust temperature sensor for matching is attached to an estimation position in the figure, and experimental data is collected. The exhaust temperature sensor for matching is attached only to the internal combustion engine 1 for experiment, and is used for matching of various constants included in the outlet gas temperature calculation unit 52, the heat radiation amount calculation unit 53, the exhaust gas temperature estimation unit 54, and the like. In the produced internal combustion engine 1, various controls are performed using the exhaust gas temperature Tex estimated by the outlet gas temperature calculation unit 52, the heat radiation amount calculation unit 53, and the exhaust gas temperature estimation unit 54.

A combustion chamber outlet and an exhaust pipe inlet correspond to a boundary part between the combustion chamber and the exhaust port, and correspond to a position where the exhaust valve 15 is disposed. From the combustion chamber outlet to the estimation position (attaching position of the exhaust temperature sensor for matching) is supposed to be a cylindrical tubular. An internal surface area of the exhaust pipe from the combustion chamber outlet to the estimation position becomes a total heat transfer area A0 [m$^2$] in which heat is transferred to the exhaust pipe from the exhaust gas. In the case of a plurality of cylinders, a value obtained by dividing the total internal surface area A0 from the combustion chamber outlets of all cylinders to the estimation position by number of cylinders can be used. The exhaust gas flow rate which flows through the exhaust pipe is set to Qex [g/s]. The outside of the exhaust pipe is cooled by outside air (air near the exhaust pipe), and this outside air temperature Ta [K] is assumed to be constant.

Next, an outlet gas temperature which is a temperature of the exhaust gas at the combustion chamber outlet is set to Tout [K], and a difference between this outlet gas temperature Tout and the outside air temperature Ta is set to θ1. An exhaust gas temperature at the estimation position is set to Tex [K], and a difference between the exhaust gas temperature Tex and the outside air temperature Ta is set to θ2. The exhaust gas temperature Tex is a temperature without influence of response delay of the exhaust temperature sensor, and becomes an instantaneous value of exhaust gas temperature. Out of the total heat transfer areas A0, area from the combustion chamber outlet to any positions is set to A [m$^2$]; instantaneous exhaust gas temperature in any position is set to T [K]; and a change of the exhaust gas temperature in a tiny heat transfer area dA at any positions is set to dT. If a difference between the instantaneous exhaust gas temperature I and the outside air temperature Ta is set to θ, it becomes dθ=dT. The heat amount dQ exchanged per unit time at this tiny heat transfer area dA is expressed as the next equation using a heat transmission coefficient (overall heat transfer coefficient) Kht [W/(m$^2$·K)].

$$dQ = Kht \cdot (T - Ta) \cdot dA = Kht \cdot \theta \cdot dA \quad (\because \theta = T - T_a) \quad (1)$$

A product of the exhaust gas flow rate Qex [g/s] and a specific heat Cex [J/(g·K)] of the exhaust gas is called a water equivalent. Since the exhaust gas of this water equivalent loses heat of dQ [J], and temperature falls only dT, it can be expressed by the next equation.

$$dQ = -Qex \cdot Cex \cdot dT = -Qex \cdot Cex \cdot d\theta \quad (\because d\theta = dT) \quad (2)$$

dQ is deleted from the equation (1) and the equation (2), and by rearranging and integrating, the next equation is obtained. Here, "Const" is an integration constant.

$$-Qex \cdot Cex \cdot d\theta = Kht \cdot \theta \cdot dA \Rightarrow \frac{d\theta}{\theta} = -\frac{Kht}{Qex \cdot Cex} \cdot dA \quad (3)$$

$$\therefore \ln\theta = -\frac{Kht \cdot A}{Qex \cdot Cex} + Const$$

Since it is A=0 and θ=θ1 at the combustion chamber outlet, and it is A=A0 and θ=θ2 at the estimation position, if these are applied to the equation (3) and the equation is modified, the next equation is obtained.

$$\ln\theta 1 = Const, \ln\theta 2 = -\frac{Kht \cdot A0}{Qex \cdot Cex} + Const \quad (4)$$

$$\Rightarrow \ln\theta 2 - \ln\theta 1 = \ln\frac{\theta 2}{\theta 1} = -\frac{Kht \cdot A0}{Qex \cdot Cex}$$

$$\therefore \frac{\theta 2}{\theta 1} = \exp\left(-\frac{Kht \cdot A0}{Qex \cdot Cex}\right)$$

The heat amount Q [J] taken by the outside air in this exhaust pipe is expressed by the next equation.

$$Q = Qex \cdot Cex \cdot (Tout - Tex) = Qex \cdot Cex \cdot (\theta 1 - \theta 2) \quad (5)$$

Since a maximum value Qmax of the heat amount taken by the outside air in this exhaust pipe is a case of θ2=0 (a case where the exhaust gas temperature Tex is cooled to the outside air temperature Ta), the next equation is obtained.

$$Qmax = Qex \cdot Cex \cdot (Tout - Ta) = Qex \cdot Cex \cdot \theta 1 \quad (6)$$

A temperature efficiency η of the exhaust pipe is expressed by the next equation from the equation (4), the equation (5), and the equation (6).

$$\eta = \frac{Q}{Qmax} = \frac{\theta 1 - \theta 2}{\theta 1} = 1 - \exp\left(-\frac{Kht \cdot A0}{Qex \cdot Cex}\right) \quad (7)$$

Supposing that the heat transmission coefficient Kht, the total heat transfer area A0 from the combustion chamber outlet to the estimation position, and the specific heat Cex of the exhaust gas are constant values in the equation (7), it is seen that the temperature efficiency η of the exhaust pipe is a function of the exhaust gas flow rate Qex. Eventually, if the temperature efficiency η[%] of the exhaust pipe corresponding to the exhaust gas flow rate Qex, the outside air temperature Ta, and the outlet gas temperature Tout are obtained, the exhaust gas temperature Tex can be estimated by the next equation.

$$\eta = \frac{\theta 1 - \theta 2}{\theta 1} = \frac{Tout - Tex}{Tout - Ta} \quad (8)$$

$$\therefore Tex = Tout - \eta \cdot (Tout - Ta)$$

The right side second term of the second equation of the equation (8) expresses a temperature decrease amount ΔTd in the case of applying the single flow heat exchanger model to the exhaust system. By the above, the method of calculating the exhaust gas temperature Tex from the outlet gas temperature Tout, the outside air temperature Ta, and the temperature efficiency η of the exhaust pipe were shown.

<Calculation Method of Outlet Gas Temperature Tout>

Figure 5:
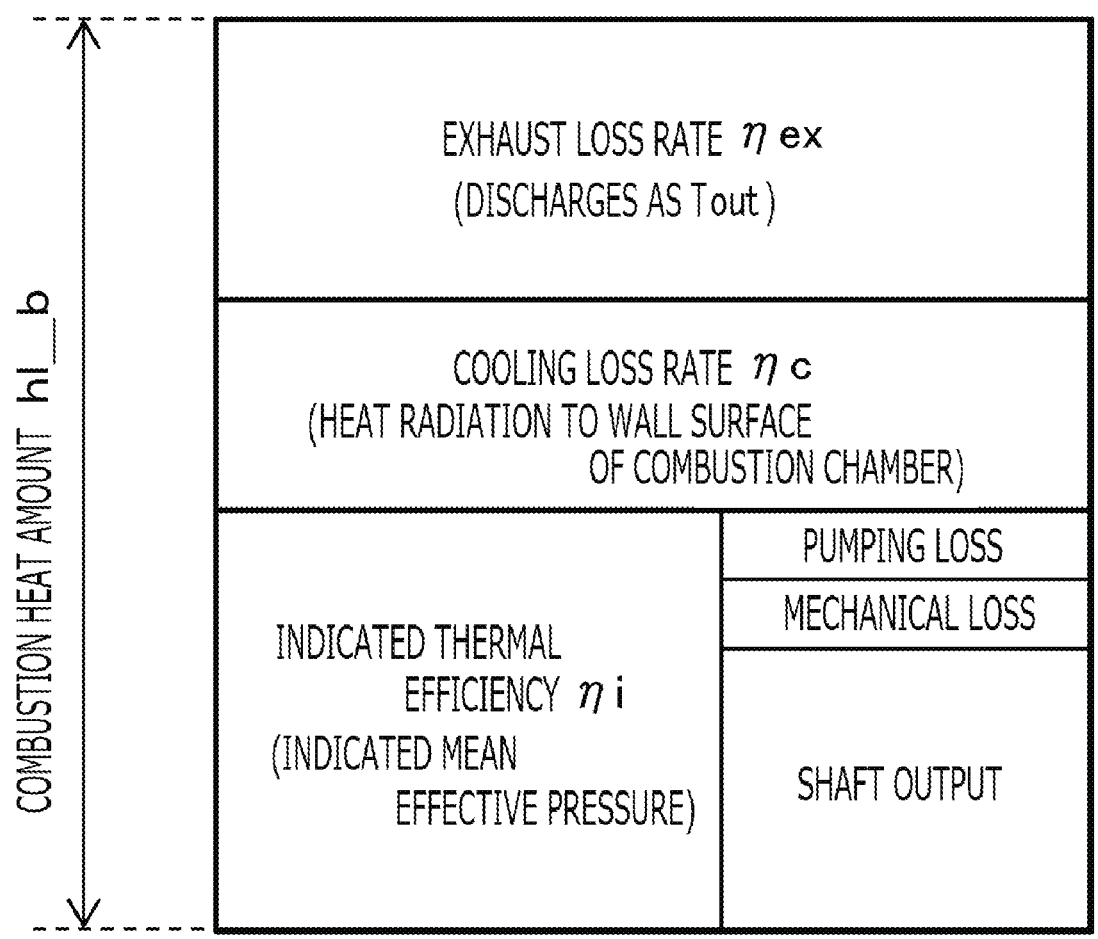
FIG. 5 is a figure showing a concept of heat balance according to Embodiment 1 of the present disclosure.

A calculation method of the outlet gas temperature Tout required for calculating the exhaust gas temperature Tex will be explained using the equation (8). Heat balance shows how a combustion heat amount h1_b generated by combustion of the fuel supplied to the combustion chamber is distributed; and the concept of heat balance is shown in FIG. 5. Out of the combustion heat amount h1_b, a ratio of a heat amount which can be taken out as work by an internal cylinder pressure of the combustion chamber is set to an indicated thermal efficiency ηi [%], a ratio of a heat amount which is radiated to the wall surface of the combustion chamber in the expansion stroke is set to a cooling loss rate ηc [%], and the remainder is set to an exhaust loss rate ηex [%] which is a ratio of a heat amount which is used for a temperature rise of the exhaust gas. Although a pumping loss and a mechanical loss were once taken out as work, they are considered to be work used other than a shaft output and to be included in the indicated thermal efficiency ηi. Here, if it is supposed that the indicated thermal efficiency ηi and the cooling loss rate ηc are known, the exhaust loss rate ηex can be expressed by the next equation.

$$\eta ex = 100 - \eta i - \eta c \quad (9)$$

At this time, if a manifold air temperature which is a temperature of a gas induced into the intake manifold 12 is set to Tin [K], a combustion heat amount which is generated by this time combustion is set to h1_b [J/stroke], a combustion chamber gas amount in this time combustion is set to Qall [g/stroke], and a specific heat of a combustion chamber gas (exhaust gas) is set to Cex [J/(g·K)], a basic value Tout0 [K] of the outlet gas temperature is calculated by the next equation.

$$Tout0 = Tin + \frac{h1\_b \cdot \frac{\eta ex}{100}}{Cex \cdot Qall} \quad (10)$$

Here, the reason for setting the outlet gas temperature calculated by the equation (10) to the basic value is because it is necessary to correct a drop amount of the outlet gas temperature by enrichment when the air-fuel ratio is rich; although the outlet gas temperature calculated by the equation (10) can be directly used when the air-fuel ratio is the theoretical air-fuel ratio or lean. The reason for temperature drop by enrichment is considered due to an evaporation heat by evaporation of fuel, and energy consumed when unburnt fuel is decomposed into hydrocarbon with a small molecular weight. Eventually, if the temperature decrease amount by enrichment is set to an enrichment temperature decrease amount ΔTrich, the outlet gas temperature Tout is calculated by the next equation. Since the outlet gas temperature Tout can be calculated by the above, the exhaust gas temperature Tex can also be calculated.

$$Tout = Tout0 - \Delta Trich \quad (11)$$

<Outlet Gas Temperature Calculation Unit>

Figure 6:
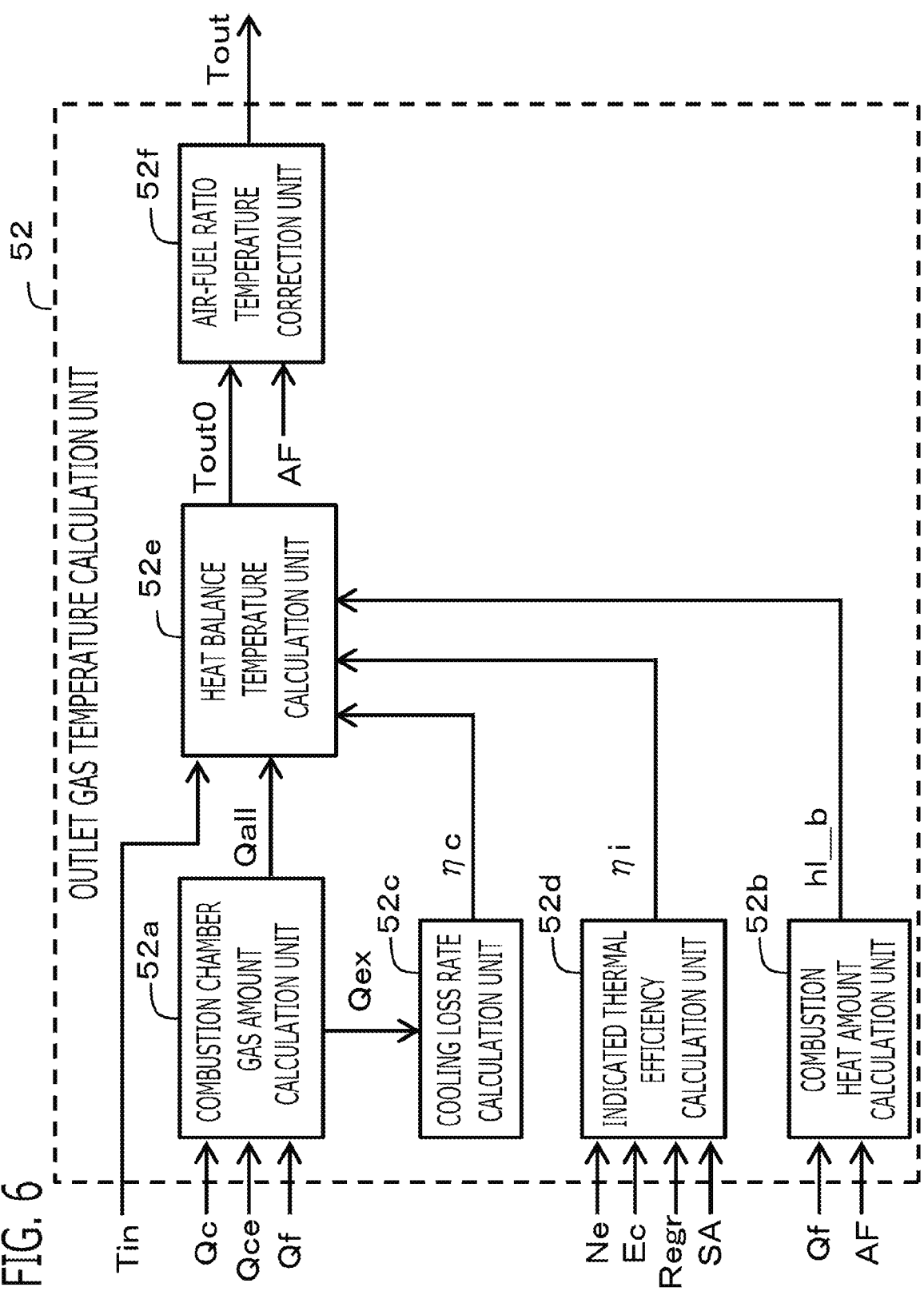
FIG. 6 is a detailed block diagram of an outlet gas temperature calculation unit according to Embodiment 1 of the present disclosure.

The controller 50 which is designed based on the calculation method derived above will be explained. The outlet gas temperature calculation unit 52 calculates the outlet gas temperature Tout which is the temperature of the exhaust gas at the outlet of the combustion chamber based on driving condition. As shown a detailed block diagram of the outlet gas temperature calculation unit 52 in FIG. 6, the outlet gas temperature calculation unit 52 is provided with a combustion chamber gas amount calculation unit 52a, a combustion heat amount calculation unit 52b, a cooling loss rate calculation unit 52c, an indicated thermal efficiency calculation unit 52d, a heat balance temperature calculation unit 52e, and an air-fuel ratio temperature correction unit 52f.

The combustion chamber gas amount calculation unit 52a calculates the combustion chamber gas amount Qall which is the gas amount flowed into the combustion chamber. In the present embodiment, as shown in the next equation, the combustion chamber gas amount calculation unit 52a calculates, as the combustion chamber gas amount Qall [g/stroke], a value obtained by summing up the intake air amount Qc which is the air amount flowed into the combustion chamber [g/stroke], the EGR amount Qce which is the exhaust gas recirculation amount flowed into the combustion chamber [g/stroke], and the fuel injection amount Qf supplied to the combustion chamber [g/stroke]. The intake air amount Qc and the EGR amount Qce are calculated by the driving condition detection unit 51 as mentioned above.

$$Qall = Qc + Qce + Qf \quad (12)$$

As shown in the next equation, the combustion chamber gas amount calculation unit 52a calculates a value obtained by dividing the combustion chamber gas amount Qall by the stroke period ΔTsgt, as the exhaust gas flow rate Qex [g/s] discharged in the exhaust stroke. If it is 3-cylinder engine, the stroke period ΔTsgt becomes a period of 240 degCA, and if it is 4-cylinder engine, the stroke period ΔTsgt becomes a period of 180 degCA. Here, (n) expresses a present stroke, and (n−3) expresses a stroke before 3 strokes from the present stroke. Qex(n) expresses the exhaust gas flow rate discharged from the cylinder which is in the exhaust stroke currently, and Qall(n−3) expresses the combustion chamber gas amount flowed in when the cylinder which is in the exhaust stroke currently was in the intake stroke three strokes ago.

$$Qex(n) = \frac{Qall(n-3)}{\Delta Tsgt(n)} \quad (13)$$

The combustion heat amount calculation unit 52b calculates the combustion heat amount h1_b generated by combustion of fuel in the combustion chamber. The combustion heat amount calculation unit 52b calculates a burned fuel amount Qfb [g/stroke] which actually burned out of the fuel injection amount Qf, based on the fuel injection amount Qf [g/stroke] and the air-fuel ratio AF. When the air-fuel ratio AF is the theoretical air-fuel ratio or lean, it can be supposed that all fuel injection amount Qf burns; but when air-fuel ratio AF is rich, the fuel amount for the theoretical air-fuel ratio burns, but the fuel amount for rich beyond the theoretical air-fuel ratio does not burn. Accordingly, as shown in the next equation, the combustion heat amount calculation unit 52b sets the fuel injection amount Qf to the burned fuel amount Qfb directly, when the air-fuel ratio AF is the theoretical air-fuel ratio or lean; and calculates a value obtained by multiplying a value obtained by dividing the air-fuel ratio AF by the theoretical air-fuel ratio AF0 to the fuel injection amount Qf, as the burned fuel amount Qfb, when the air-fuel ratio AF is rich. As the air-fuel ratio AF, the target air fuel ratio used for calculation of the fuel injection amount Qf may be used, or the air-fuel ratio of the exhaust gas detected by the air-fuel ratio sensor 18 may be used.

1) When air-fuel ratio is theoretical air-fuel ratio or lean  (14)

$$Qfb = Qf$$

2) When air-fuel ratio is rich $$Qfb = Qf \cdot \frac{AF}{AF0}$$

Then, the combustion heat amount calculation unit 52b calculates a value obtained by multiplying a unit calorific value to the burned fuel amount Qfb [g/stroke], as the combustion heat amount h1_b [J/stroke]. The unit calorific value of gasoline is set to around 44000 [J/g]. The evaporation heat amount of fuel may be subtracted from the unit calorific value, or it may be ignored since the evaporation heat amount of gasoline is around 272 [J/g].

The cooling loss rate calculation unit 52c calculates the cooling loss rate ηc which is a ratio of the heat amount radiated to the wall surface of the combustion chamber out of the combustion heat amount h1_b generated by burning. From the experimental result which the inventor of present application carried out, it was found out that there is a strong correlation between the exhaust gas flow rate Qex and the cooling loss rate ηc calculated by backward calculation, without depending on operating condition. Accordingly, the cooling loss rate calculation unit 52c calculates the cooling loss rate ηc based on the exhaust gas flow rate Qex in the exhaust pipe. Specifically, by referring to a loss factor characteristic data in which a relationship between the exhaust gas flow rate Qex and the cooling loss rate ηc is preliminarily set, the cooling loss rate calculation unit 52c calculates the cooling loss rate ηc(n) corresponding to the present exhaust gas flow rate Qex(n). In the loss factor characteristic data, a characteristic that the cooling loss rate ηc decreases as the exhaust gas flow rate Qex increases is preliminarily set based on experimental data. For each characteristic data, a data map, a data table, a polynomial, an equation, or the like is used, and those setting data are stored in the storage apparatus 91.

The indicated thermal efficiency calculation unit 52d calculates the indicated thermal efficiency ηi which is a ratio of the heat amount which can be taken out as work by the internal cylinder pressure of the combustion chamber out of the combustion heat amount h1_b. By Referring to an indicated thermal efficiency characteristic data in which a relationship between operating condition, such as the rotational speed Ne, the charging efficiency Ec, the EGR rate Regr, and the ignition timing SA, and the indicated thermal efficiency ηi is preliminarily set, the indicated thermal efficiency calculation unit 52d calculates the indicated thermal efficiency ηi corresponding to the present operating condition. Here, for the present charging efficiency Ec and the present EGR rate Regr, values when the cylinder which is in the exhaust stroke currently was in the intake stroke three strokes ago are used.

For the indicated thermal efficiency characteristic data, one used for the calculation of output torque in the torque base control is used, and it is preliminarily set based on experimental data. Since measurement of the indicated thermal efficiency ηi will become enormous if all operation points are measured, measuring points are suppressed using methods, such as MBC (Model Based Calibration) and DoE (Design of Experiments), data of measuring points are connected by approximate expression, and approximate data corresponding to all operation points are created. A further simplified approximate expression is used for the indicated thermal efficiency characteristic data. If the torque base control is not performed, the indicated thermal efficiency characteristic data may be set to one in which a relationship among the rotational speed Ne, the charging efficiency Ec, and the indicated thermal efficiency ηi is set. For the indicated thermal efficiency ηi, a value calculated by setting the heat amount generated by combustion to a denominator and setting the heat amount corresponding to the indicated mean effective pressure to a numerator is used.

The heat balance temperature calculation unit 52e calculates the outlet gas temperature Tout based on the combustion chamber gas amount Qall [g/stroke], the combustion heat amount h1_b [J/stroke], the cooling loss rate ηc, and the indicated thermal efficiency ηi. Specifically, as mentioned above using the equation (9) and the equation (10) based on the concept of heat balance, as shown in the next equation, the heat balance temperature calculation unit 52e calculates a value obtained by subtracting the indicated thermal efficiency ηi [%] and the cooling loss rate ηc [%] from 100 [%], as the exhaust loss rate ηex [%] which is a ratio of the heat amount used for the temperature rise of the exhaust gas out of the combustion heat amount. Then, the heat balance temperature calculation unit 52e calculates a temperature rise heat amount [J/stroke] used for a temperature rise of the exhaust gas by multiplying the exhaust loss rate ηex [%] to the combustion heat amount h1_b [J/stroke]; calculates a temperature rise amount [K] by dividing the temperature rise heat amount [J/stroke] by the water equivalent [J/(stroke·g)] obtained by multiplying the combustion chamber gas amount Qall [g/stroke] and the specific heat Cex of the exhaust gas [J/(g·K)]; and calculates a basic value Tout0 [K] of the outlet gas temperature by adding the temperature rise amount [K] to the manifold temperature Tin [K].

$$\eta ex = 100 - \eta i - \eta c \quad (15)$$

$$Tout0 = Tin + \frac{h1\_b \cdot \frac{\eta ex}{100}}{Cex \cdot Qall}$$

A value about 1.1 [J/(g·K)] is set to the specific heat Cex of the exhaust gas. Since the specific heat Cex of the exhaust gas changes according to the air-fuel ratio strictly, it may be changed according to the air-fuel ratio AF, for example, by correcting using the specific heat of air and fuel, but a same fixed value may be used for simplification. As the manifold temperature Tin, the gas temperature in the intake manifold 12 detected by the manifold temperature sensor 9 may be used directly; but as the manifold temperature Tin, a temperature obtained by adding a predetermined value to the gas temperature in the intake manifold 12 so as to approach the gas temperature flowed into the combustion chamber may be used. Alternatively, as the manifold temperature Tin, a temperature obtained by correcting the gas temperature in the intake manifold 12 according to an internal EGR rate calculated based on the opening and closing timings of the intake and exhaust valves may be used. As the manifold temperature Tin, a gas temperature estimated based on the outside air temperature Ta may be used.

The air-fuel ratio temperature correction unit 52f decreases the outlet gas temperature Tout according to an enrichment amount ΔAFr, when the air-fuel ratio AF is richer than the theoretical air-fuel ratio. From the experimental result which the inventor of the present application carried out, without depending on operating condition, if enrichment amount ΔAFr increases 1, the outlet gas temperature Tout decreases by 35 to 40° C. By referring to a temperature decrease characteristic data in which a relationship between the enrichment amount ΔAFr (=AF0−AF) and an enrichment temperature decrease amount ΔTrich is preliminarily set, the air-fuel ratio temperature correction unit 52f calculates the enrichment temperature decrease amount ΔTrich corresponding to the present enrichment amount ΔAFr. In the temperature decrease characteristic data, a characteristic that the enrichment temperature decrease amount ΔTrich of a positive value increases as the enrichment amount ΔAFr increases is preliminarily set based on experimental data.

As shown in the next equation, the air-fuel ratio temperature correction unit 52f sets the basic value Tout0 of the outlet gas temperature to the outlet gas temperature Tout directly, when the air-fuel ratio AF is the theoretical air-fuel ratio or lean; and calculates a value obtained by subtracting the enrichment temperature decrease amount ΔTrich of a positive value from the basic value Tout0 of the outlet gas temperature, as the outlet gas temperature Tout, when air-fuel ratio AF is rich.

1) When air-fuel ratio is theoretical air-fuel ratio or lean $$Tout = Tout0 \quad (16)$$

2) When air-fuel ratio is rich $$Tout = Tout0 - \Delta Trich$$

<Heat Radiation Amount Calculation Unit 53>

The heat radiation amount calculation unit 53 calculates a temperature decrease amount ΔTd of the exhaust gas by heat radiation of the exhaust pipe from the outlet of the combustion chamber to the estimation position. As described above, from the equation (7) derived by modeling the exhaust pipe in the single flow heat exchanger, it is found out that the temperature efficiency η of the exhaust pipe is a function of the exhaust gas flow rate Qex; and from the equation (8), it is found out that the temperature decrease amount ΔTd can be calculated based on the temperature efficiency η of the exhaust pipe. Based on the exhaust gas flow rate Qex in the exhaust pipe, the heat radiation amount calculation unit 53 calculates the temperature efficiency η of the exhaust pipe as the single flow heat exchanger, which sets the exhaust gas in the exhaust pipe to a heating fluid and sets an air outside the exhaust pipe to a heat receiving fluid; and calculates the temperature decrease amount ΔTd based on the temperature efficiency η of the exhaust pipe.

By using the next equation similar to the equation (7), the heat radiation amount calculation unit 53 calculates the temperature efficiency η of the exhaust pipe based on the exhaust gas flow rate Qex.

$$\eta = 1 - \exp\left(-\frac{K\eta}{Qex}\right) \quad (17)$$
$$K\eta = \frac{Kht \cdot A0}{Cex}$$

Kη is an arithmetic constant. The arithmetic constant Kη can be set by multiplying the total heat transfer area A0 from the combustion chamber outlet to the estimation position to the heat transmission coefficient Kht of the exhaust pipe, and dividing by the specific heat Cex of exhaust gas. Although the heat transmission coefficient Kht of the exhaust pipe is a matching value, it becomes a value about 10 to 15 [W/(m²·K)], for example. The total heat transfer area A0 can be calculated from the structure of the exhaust pipe. For the specific heat Cex of the exhaust gas, the value mentioned above is used. The arithmetic constant Kη may be set to a fixed value, but it may be changed according to the specific heat Cex of the exhaust gas which is changed according to the air-fuel ratio AF. The arithmetic constant Kη may be set to a matching value by experiment.

Alternatively, by referring to a temperature efficiency characteristic data in which a relationship between the exhaust gas flow rate Qex and the temperature efficiency η of the exhaust pipe is preliminarily set, the heat radiation amount calculation unit 53 calculates the temperature efficiency η of the exhaust pipe corresponding to the present exhaust gas flow rate Qex. Although the temperature efficiency characteristic data expresses the characteristic of the equation (17), it may be matched by experiment. For example, based on measured values of the outlet gas temperature Tout using the exhaust temperature sensor for matching, measured values of the exhaust gas temperature Tex0 of the estimation position using the exhaust temperature sensor for matching, and measured values of the outside air temperature Ta, which were measured at a plurality of operating points of the exhaust gas flow rates Qex, the temperature efficiency η of the exhaust pipe is calculated using the first equation of the equation (8). Then, the temperature efficiency characteristic data is set by approximating the experimental data of the exhaust gas flow rate Qex and the temperature efficiency η of the exhaust pipe at a plurality of operating points. The arithmetic constant Kη may be set by a similar method.

As shown in the next equation similar to the second equation of the equation (8), the heat radiation amount calculation unit 53 calculates a value obtained by multiplying the temperature efficiency η of the exhaust pipe to a value obtained by subtracting the outside air temperature Ta from the outlet gas temperature Tout calculated by the outlet gas temperature calculation unit 52, as the temperature decrease amount ΔTd of the exhaust gas.

$$\Delta Td = \eta \cdot (Tout - Ta) \quad (18)$$

<Exhaust Gas Temperature Estimation Unit 54>

As shown in the next equation, the exhaust gas temperature estimation unit 54 estimates the exhaust gas temperature Tex at the estimation position by subtracting the temperature decrease amount ΔTd from the outlet gas temperature Tout.

$$Tex = Tout - \Delta Td \quad (19)$$

The estimation position is set to a position of the exhaust gas temperature which is required in the exhaust gas temperature utilization control unit 55 described below. For example, the estimation position is set to a position at the upstream side of the catalyst 19, a connection position between the exhaust pipe 17 and the EGR flow path 21, a position at the upstream side of a turbine in the case where a supercharger is provided in the exhaust pipe, and a position at the exhaust gas sensor in the case where the exhaust gas sensor is provided in the exhaust pipe. In accordance with the estimation position, the arithmetic constant Kη required for calculation of the temperature efficiency η or the temperature efficiency characteristic data is set.

The exhaust gas temperature estimation unit 54 may estimate the exhaust gas temperatures at a plurality of estimation positions. In this case, the heat radiation amount calculation unit 53 calculates the temperature efficiency η of the each estimation position by switching the setting value of the arithmetic constant Kη or the temperature efficiency characteristic data according to the each estimation position, and calculates the temperature decrease amount ΔTd of the each estimation position. Then, the exhaust gas temperature estimation unit 54 estimates the exhaust gas temperature Tex at the each estimation position using the temperature decrease amount ΔTd of the each estimation position. In this way, the exhaust gas temperatures at the plurality of estimation positions can be easily estimated only by switching the arithmetic constant Kη or the temperature efficiency characteristic data according to the each estimation position.

As described later, if the exhaust gas temperature sensor is provided in the exhaust pipe and it performs abnormality diagnosis of the exhaust gas temperature sensor, the exhaust gas temperature detected by the exhaust gas temperature sensor and the estimated exhaust gas temperature Tex are compared. However, a response delay by the heat capacity of the sensor and the like occurs in the exhaust gas temperature detected by the exhaust gas temperature sensor. Or, a response delay by the heat capacity of the exhaust pipe occurs in the exhaust gas temperature. Then, the exhaust gas temperature estimation unit 54 calculates an exhaust gas temperature Texft after response delay processing by performing response delay processing to the exhaust gas temperature Tex. For example, the exhaust gas temperature estimation unit 54 calculates the exhaust gas temperature Texft after response delay processing by performing first order lag filter processing shown in the next equation. Here, a filter constant Kf is set by a time constant i of sensor and a calculation cycle Δt. (n) expresses a value in the present calculation cycle, and (n−1) expresses a value in the immediately previous calculation cycle.

$$Texft(n) = Kf \cdot Texft(n-1) + (1 - Kf) \cdot Tex(n) \quad (20)$$
$$Kf = \exp\left(-\frac{\Delta t}{\tau}\right)$$

<Exhaust Gas Temperature Utilization Control Unit 55>

The exhaust gas temperature utilization control unit 55 performs one or more of exhaust gas temperature control, valve flow characteristic calculation, exhaust temperature sensor abnormality diagnosis, and turbine output calculation, which are using the estimated exhaust gas temperature Tex.

The exhaust gas temperature control is processing that controls the exhaust gas temperature, using the estimated exhaust gas temperature Tex. The exhaust gas temperature estimation unit 54 sets a position for controlling the exhaust gas temperature to the estimation position, and estimates the exhaust gas temperature. For example, when enrichment control for lowering the exhaust gas temperature is being performed, the exhaust gas temperature utilization control unit 55 changes the enrichment amount of fuel injection so that the estimated exhaust gas temperature Tex approaches a target temperature. The exhaust gas temperature utilization control unit 55 changes ignition timing SA, or changes fuel injection amount in the exhaust stroke so that the estimated exhaust gas temperature Tex approaches the target temperature.

The valve flow characteristic calculation is processing that calculates a flow characteristic of a valve in which the exhaust gas flows, using the estimated exhaust gas temperature Tex. The exhaust gas temperature estimation unit 54 sets a position at the upstream side of the valve to the estimation position, and estimates the exhaust gas temperature. The exhaust gas temperature utilization control unit 55 calculates a sonic velocity and a density of the exhaust gas at the upstream side of the valve as the flow characteristic of the valve, based on the estimated exhaust gas temperature Tex. The valve in which the exhaust gas flows is set to the EGR valve 22, a wastegate valve which bypasses the turbine of the supercharger, and the like. The exhaust gas temperature utilization control unit 55 calculates the EGR flow rate using the flow characteristic of the EGR valve 22, and calculates the EGR amount Qce and the EGR rate Regr. The exhaust gas temperature utilization control unit 55 calculates a bypass flow rate which passes the wastegate valve using the flow characteristic of the wastegate valve, calculates a turbine passing flow rate by subtracting the bypass flow rate from the exhaust gas flow rate, and calculates a turbine output using the turbine passing flow rate because the turbine passing flow rate is proportional to the turbine output. The turbine output is used for control of supercharging pressure.

The exhaust temperature sensor abnormality diagnosis is processing that performs abnormality diagnosis of the exhaust gas temperature sensor provided in the exhaust pipe, using the estimated exhaust gas temperature Tex. The exhaust gas temperature sensor is provided to manage the exhaust gas temperature which flows into a purification apparatus of the exhaust gas, such as a catalyst and a particle collection filter. The exhaust gas temperature estimation unit 54 sets a position of the exhaust gas temperature sensor to the estimation position, and estimates the exhaust gas temperature. The exhaust gas temperature utilization control unit 55 compares the estimated exhaust gas temperature Texft after response delay processing with the exhaust gas temperature detected by the exhaust gas temperature sensor, and determines occurrence of abnormality in the exhaust gas temperature sensor when a difference between the both is large.

The turbine output calculation is calculation that calculates the turbine output of the supercharger provided in the exhaust pipe, using the estimated exhaust gas temperature Tex. The exhaust gas temperature estimation unit 54 sets a position at the upstream side of the turbine to the estimation position, and estimates the exhaust gas temperature. The exhaust gas temperature utilization control unit 55 calculates the turbine output using the estimated exhaust gas temperature Tex, because the exhaust gas temperature which flows into the turbine is proportional to the turbine output.

2-2. Flowchart

The procedure (the control method of internal combustion engine 1) of schematic processing of the controller 50 concerning the present embodiment is explained based on the flow chart shown in FIG. 7. The processing represented in the flowchart in FIG. 7 is recurrently executed every predetermined operation cycle by the calculation processor 90 executing software (a program) stored in the storage apparatus 91.

In the step S01, as mentioned above, the driving condition detection unit 51 performs driving condition detection processing (driving condition detection step) that detects various kinds of driving condition of the internal combustion engine 1.

In the step S02, as mentioned above, the outlet gas temperature calculation unit 52 performs outlet gas temperature calculation processing (outlet gas temperature calculation step) that calculates the outlet gas temperature Tout which is the temperature of the exhaust gas at the outlet of the combustion chamber based on driving condition. In the present embodiment, as mentioned above, the outlet gas temperature calculation unit 52 calculates the combustion chamber gas amount Qall which is the gas amount flowed into the combustion chamber; calculates the combustion heat amount h1_b generated by combustion of fuel in the combustion chamber; calculates the cooling loss rate $\eta c$ which is a ratio of the heat amount radiated to the wall surface of the combustion chamber out of the combustion heat amount h1_b generated by burning; calculates the indicated thermal efficiency $\eta i$ which is a ratio of the heat amount which can be taken out as work by the internal cylinder pressure of the combustion chamber out of the combustion heat amount h1_b; and calculates the outlet gas temperature Tout based on the combustion chamber gas amount Qall, the combustion heat amount h1_b, the cooling loss rate $\eta c$, and the indicated thermal efficiency $\eta i$.

In the step S03, as mentioned above, the heat radiation amount calculation unit 53 performs heat radiation amount calculation processing (heat radiation amount calculation step) that calculates the temperature decrease amount $\Delta Td$ of the exhaust gas by heat radiation of the exhaust pipe from the outlet of the combustion chamber to the estimation position. In the present embodiment, the heat radiation amount calculation unit 53 calculates the temperature efficiency $\eta$ of the exhaust pipe as the single flow heat exchanger, based on the exhaust gas flow rate Qex in the exhaust pipe; and calculates the temperature decrease amount $\Delta Td$ based on the temperature efficiency $\eta$. The heat radiation amount calculation unit 53 calculates the temperature efficiency $\eta$ of the exhaust pipe based on the exhaust gas flow rate Qex using the equation (17).

In the step S04, as mentioned above, the exhaust gas temperature estimation unit 54 performs exhaust gas temperature estimation processing (exhaust gas temperature estimation step) that estimates the exhaust gas temperature Tex at the estimation position by subtracting the temperature decrease amount $\Delta Td$ from the outlet gas temperature Tout.

In the step S05, as mentioned above, the exhaust gas temperature utilization control unit 55 performs exhaust gas temperature utilization control processing (exhaust gas temperature utilization control step) that performs one or more of exhaust gas temperature control, valve flow characteristic calculation, exhaust temperature sensor abnormality diagnosis, and turbine output calculation, which are using the estimated exhaust gas temperature Tex.

<Other Embodiments>

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the internal combustion engine 1 is a gasoline engine. However, the embodiments of the present disclosure are not limited to this example. That is to say, the internal combustion engine 1 may be various kinds of internal combustion engines, such as a diesel engine and an engine which performs HCCI combustion (Homogeneous-Charge Compression Ignition Combustion).

(3) As explained exemplarily in the above-mentioned Embodiment 1, the internal combustion engine 1 may be provided with the supercharger. The supercharger is provided with a turbine provided in the exhaust pipe, a compressor provided at the upstream side of the throttle valve in the intake pipe and rotates integrally with the turbine, and a wastegate valve provided in a turbine bypass path which bypasses the turbine. The internal combustion engine 1 may be provided with the particle collection filter in addition to the catalyst, and may be provided with the exhaust gas temperature sensor at the upstream side of the catalyst and the particle collection filter.

Various modifications and alterations of this disclosure will be apparent to those skilled in the art without departing from the scope and spirit of this disclosure, and it should be understood that this is not limited to the illustrative embodiments set forth herein.

What is claimed is:

1. A controller for an internal combustion engine comprising:
    a driving condition detector that detects a driving condition of the internal combustion engine;
    an outlet gas temperature calculator that calculates an outlet gas temperature which is a temperature of exhaust gas at an outlet of a combustion chamber, based on the driving condition;
    a heat radiation amount calculator that calculates a temperature decrease amount of the exhaust gas by heat radiation of an exhaust pipe from the outlet of the combustion chamber to an estimation position; and
    an exhaust gas temperature estimation calculator that estimates an exhaust gas temperature at the estimation position by subtracting the temperature decrease amount from the outlet gas temperature.

2. The controller for the internal combustion engine according to claim 1, wherein the heat radiation amount calculator, based on an exhaust gas flow rate in the exhaust pipe, calculates a temperature efficiency of the exhaust pipe as a single flow heat exchanger, which sets the exhaust gas in the exhaust pipe to a heating fluid and sets an air outside the exhaust pipe to a heat receiving fluid; and
    calculates the temperature decrease amount based on the temperature efficiency.

3. The controller for the internal combustion engine according to claim 1, wherein the heat radiation amount calculator sets a temperature efficiency of the exhaust pipe to η, sets an exhaust gas flow rate in the exhaust pipe to Qex, sets an arithmetic constant to Kη, and calculates the temperature efficiency by a calculation equation of "$\eta = 1 - \exp(-K\eta/Qex)$"; and
    calculates the temperature decrease amount based on the temperature efficiency.

4. The controller for the internal combustion engine according to claim 1, wherein the heat radiation amount calculator, by referring to a temperature efficiency characteristic data in which a relationship between an exhaust gas flow rate in the exhaust pipe and a temperature efficiency of the exhaust pipe is preliminarily set, calculates the temperature efficiency corresponding to a present exhaust gas flow rate; and
    calculates the temperature decrease amount based on the temperature efficiency.

5. The controller for the internal combustion engine according to claim 2, wherein the heat radiation amount calculator calculates a value obtained by multiplying the temperature efficiency to a value obtained by subtracting an outside air temperature from the outlet gas temperature, as the temperature decrease amount.

6. The controller for the internal combustion engine according to claim 1, wherein the outlet gas temperature calculator calculates a combustion chamber gas amount which is a gas amount flowed in the combustion chamber;
    calculates a combustion heat amount generated in the combustion chamber by combustion of fuel;
    calculates a cooling loss rate, which is a ratio of a heat amount radiated to a wall surface of the combustion chamber out of the combustion heat amount;
    calculates an indicated thermal efficiency, which is a ratio of a heat amount taken out as work by an internal cylinder pressure of the combustion chamber out of the combustion heat amount; and
    calculates the outlet gas temperature based on the combustion chamber gas amount, the combustion heat amount, the cooling loss rate, and the indicated thermal efficiency.

7. The controller for the internal combustion engine according to claim 6, wherein the outlet gas temperature calculator calculates the cooling loss rate based on an exhaust gas flow rate in the exhaust pipe.

8. The controller for the internal combustion engine according to claim 1, wherein the outlet gas temperature calculator decreases the outlet gas temperature according to an enrichment amount, when an air-fuel ratio is richer than a theoretical air-fuel ratio.

9. The controller for the internal combustion engine according to claim 1, further comprising:
    an exhaust gas temperature utilization controller that performs any one or more of
    exhaust gas temperature control that controls the exhaust gas temperature using the estimated exhaust gas temperature;
    valve flow characteristic calculation that calculates a flow characteristic of a valve in which exhaust gas flows using the estimated exhaust gas temperature;
    exhaust temperature sensor abnormality diagnosis that performs abnormality diagnosis of an exhaust gas temperature sensor provided in the exhaust pipe using the estimated exhaust gas temperature; and
    turbine output calculation that calculates a turbine output of a supercharger provided in the exhaust pipe using the estimated exhaust gas temperature.

10. The controller for the internal combustion engine according to claim 1, wherein the estimation position is different from a position of the outlet of the combustion chamber.

11. The controller for the internal combustion engine according to claim 3, wherein the heat radiation amount calculator calculates the temperature efficiency of each estimation position by switching a setting value of the arithmetic constant, and calculates a value obtained by multiplying the temperature efficiency of each estimation position to a value obtained by subtracting an outside air temperature from the outlet gas temperature, as the temperature decrease amount of each estimation position, and wherein the exhaust gas temperature estimation calculator estimates the exhaust gas temperature at each estimation position by subtracting the temperature decrease amount at each estimation position from the outlet gas temperature.

12. A control method for an internal combustion engine comprising:

detecting a driving condition of an internal combustion engine;

calculating an outlet gas temperature which is a temperature of exhaust gas at an outlet of a combustion chamber, based on the driving condition;

calculating a temperature decrease amount of the exhaust gas by heat radiation of an exhaust pipe from the outlet of the combustion chamber to an estimation position; and estimating an exhaust gas temperature at the estimation position by subtracting the temperature decrease amount from the outlet gas temperature.

* * * * *